United States Patent
Pahr et al.

(10) Patent No.: US 7,280,139 B2
(45) Date of Patent: Oct. 9, 2007

(54) DOUBLE SAMPLING ACTIVE PIXEL SENSOR WITH DOUBLE SAMPLING TEMPERATURE SENSOR

(75) Inventors: Per Olaf Pahr, Lier (NO); Alf Olsen, Oslo (NO); Eric R. Fossum, Wolfeboro, NH (US)

(73) Assignee: Micron Technology, Inc., Boise, ID (US)

( * ) Notice: Subject to any disclaimer, the term of this patent is extended or adjusted under 35 U.S.C. 154(b) by 766 days.

(21) Appl. No.: 10/202,623

(22) Filed: Jul. 22, 2002

(65) Prior Publication Data

US 2003/0107661 A1 Jun. 12, 2003

Related U.S. Application Data

(60) Provisional application No. 60/306,718, filed on Jul. 20, 2001.

(51) Int. Cl.
*H04N 5/217* (2006.01)

(52) U.S. Cl. .................................. 348/241; 348/244
(58) Field of Classification Search ................ 348/308, 348/310, 241, 244, 250
See application file for complete search history.

(56) References Cited

U.S. PATENT DOCUMENTS

| | | | | |
|---|---|---|---|---|
| 5,877,715 A | * | 3/1999 | Gowda et al. | 341/122 |
| 6,630,955 B2 | * | 10/2003 | Takada | 348/241 |
| 6,642,776 B1 | * | 11/2003 | Micheloni et al. | 327/539 |

* cited by examiner

*Primary Examiner*—Ngoc-Yen Vu
*Assistant Examiner*—Nicholas G. Giles
(74) *Attorney, Agent, or Firm*—Dickstein Shapiro LLP

(57) ABSTRACT

A system which operates to determine temperature of an image sensor using the same signal chain that is used to detect the image sensor actual outputs. A correlated double sampling circuit is used to obtain the image outputs. That's same correlated double sampling circuit is used to receive two different inputs from the temperature circuit, and to subtract one from the other. The temperature output can be perceived, for example, once each frame.

31 Claims, 4 Drawing Sheets

DOUBLE SAMPLING ACTIVE PIXEL SENSOR WITH DOUBLE SAMPLING TEMPERATURE SENSOR

CROSS-REFERENCE TO RELATED APPLICATIONS

This application claims benefit of U.S. Provisional Application No. 60/306,718, filed Jul. 20, 2001.

BACKGROUND

Image sensors strive for more accuracy in the image readout chain. Different techniques are used, including techniques to cancel out various kinds of noise. Different characteristics of image sensors are also dependent on temperature. Accordingly, temperature compensation may also be used to monitor for, and correct for, errors in the acquired signal.

The present application teaches a new technique allowing reading out a signal that is proportional to the temperature of an image sensor. This temperature may be used to compensate for the effect of the temperature on an image sensor pixel array.

BRIEF DESCRIPTION OF THE DRAWINGS

These and other aspects will now be described in detail with reference to the accompanying drawings, wherein.

DETAILED DESCRIPTION

Figure 1:
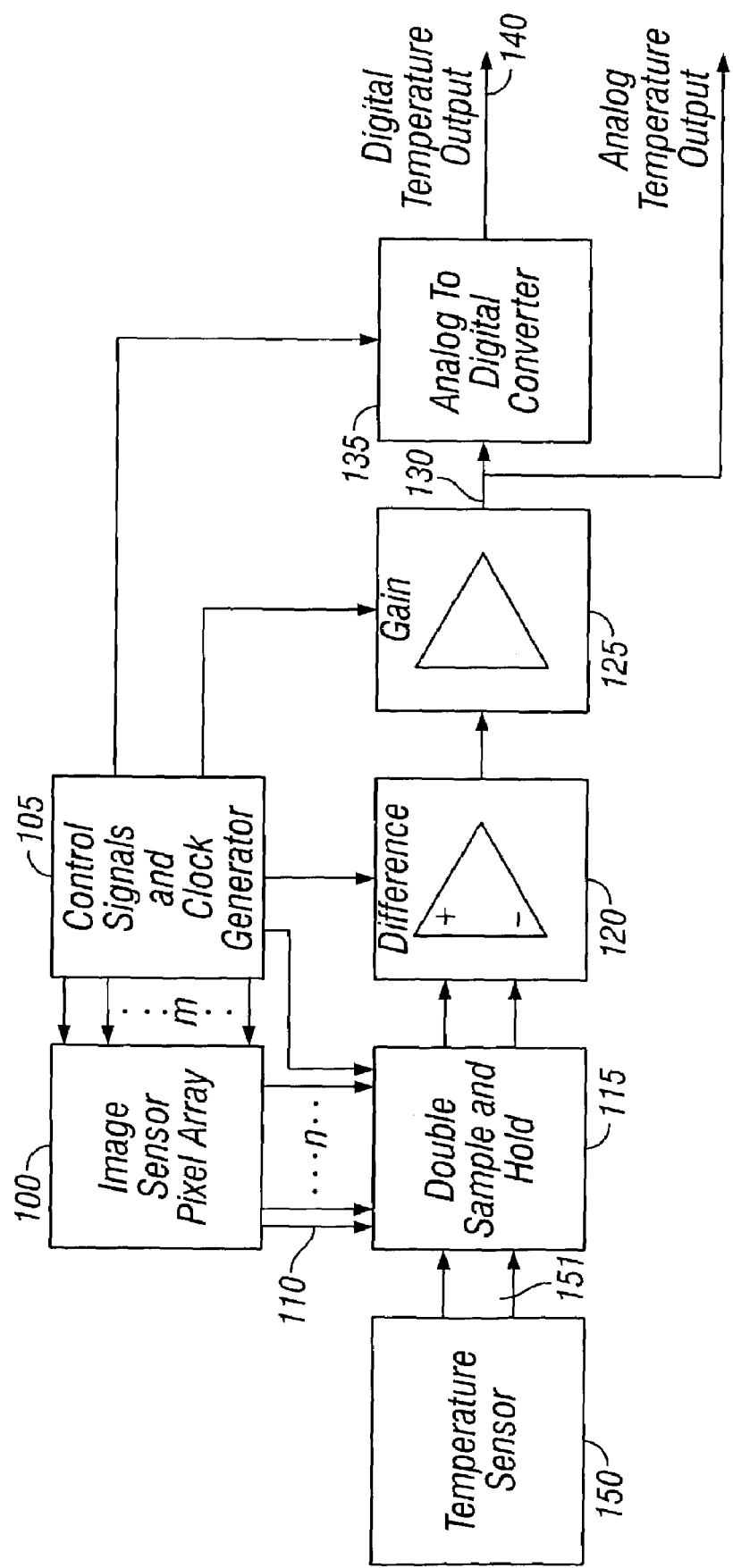
FIG. 1 shows a block diagram of the system.

An embodiment is shown in FIG. 1, which illustrates a block diagram of an image sensor with an included temperature sensor. Basically, this system provides an image sensing system in which outputs can represent either the output of the image sensor, and/or at temperature of the image sensor, e.g. the temperature of the substrate on which the image sensor is formed. The system includes an improved temperature sensor circuit which determines the temperature of the substrate, e.g. the silicon.

The system of FIG. 1 shows an active pixel sensor, which may be formed using CMOS circuitry for example. However, these techniques may also be applied to any other family or type of image sensor. An image sensor pixel array 100, for example an image sensor array having "m" rows and "n" columns, is driven by a control signal generator 105 that generates control signals and clock pulses for the pixel array. The output of the pixel array 110 is provided in parallel form to a double sample and hold circuit 115, that is, one which holds two values. Sample and hold circuit 115 may carry out a correlated double sampling from the image sensor, to produce an output signal that is proportional to the difference between the value of each pixel prior to light integration, and the value of the pixel after the light integration is complete. The difference circuit 120 may determine the difference between the two signals. Controlling element 105 may also produce the control signals for the difference circuit 120. The output of difference circuit 120 is amplified by a gain circuit 125, and output as an analog signal 130. The final output signal may be this analog signal 130. Alternatively, an A/D converter 135 may be used to produce a digital output 140 indicative of the analog signal 130.

A second input to the double sample and hold circuit 115 comes from a temperature sensor 150. The output 151 of the temperature sensor is also received by the sample and hold circuit 115, and passes through the signal chain in the same way as the image sensor outputs.

In this way, a signal which is directly proportional to temperature can be received from the temperature sensor 150. This may be done, for example, during a time slot while the image readout is inactive. It may be done for example at the beginning of each image, or at the beginning or end of each one frame, or every few lines, or any other interval of pixels or time. In this way, changes in temperature which fluctuate on a relatively short time frame may be used as correction, as often as desired.

In a typical implementation of an image sensor, such as the one described herein, a hotter chip provides a whiter image, or put another way, the black level of an image pixel has a higher voltage than the white level. Increasing the temperature causes a correspondingly decreased pixel signal voltage. This is the typical case when a pixel photodiode is implemented in a P type silicon or P type diffusion well. In the opposite case, where an N type substrate or N type well is used to embed the photoreceptor, an increasing voltage may correspond to a higher temperature. A relationship between the temperature and the amount of compensation of image output may be stored.

Figure 2:
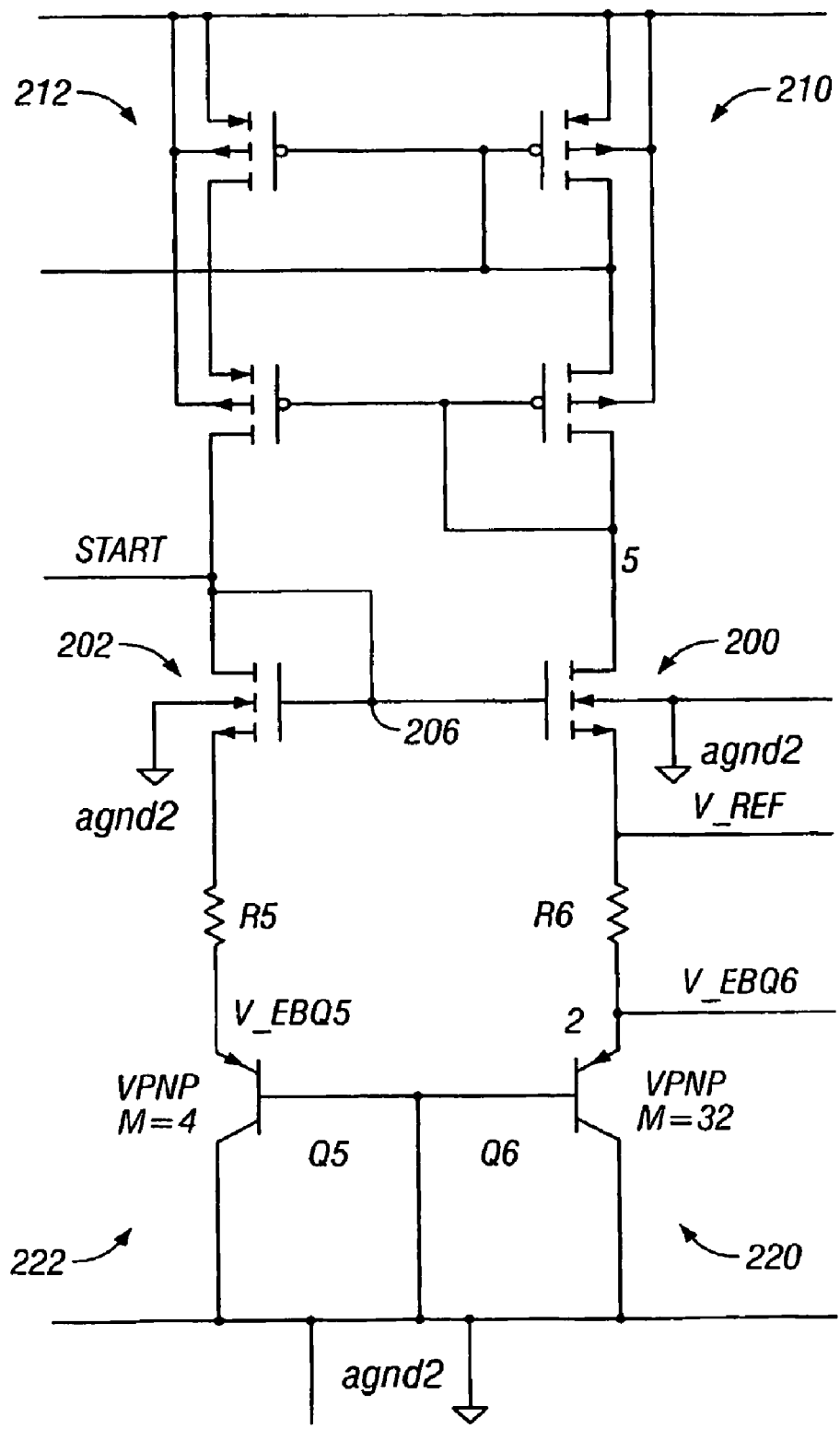
FIG. 2 shows a circuit diagram of a bandgap cell.

A so-called bandgap cell is shown in FIG. 2. This cell includes the temperature and voltage stabilized output labeled as $V_{REF}$. The output $V_{EB,Q6}$ is a voltage drop away from the reference voltage, and has a linear and negative temperature coefficient relative to that reference voltage. In this system, a startup transient current input is required at the node labeled "START". After reaching steady-state, the currents in transistors Q5 and Q6 eventually equalize.

The FIG. 2 circuit is based on the Brokaw type bandgap reference circuit which is well-known.

In FIG. 2, the two NMOS transistors 200, 202 share the same gate voltage by virtue of their common gate node 206. The transistors 200, 202 are matched to have the same or similar transconductance. Therefore, the source potentials will be the same when they conduct the same current.

The CMOS transistors 210,212 form a current mirror keeps the source potential of the two NMOS transistors 200, 202 constant. The current mirror is also part of a closed looped amplifier which insures that the source potential of the NMOS transistors will be kept low due to feedback. This loop should be kept stable.

Equal currents are hence forced through the two base P-N junctions of the diode-coupled transistors 220,222. These transistors have different areas, with the area ratio between transistor 222 and 225 being 4:32 equals 1:8. Because of this area difference, there will be a difference in the P-N junction voltage drop across the junctions according to $$\Delta V_{EB} = V_{EB,Q5} - V_{EB,Q6} \quad (1)$$

It can be shown that $$\Delta V_{EB} = -V_T \ln(1/8) = -(kT/q)\cdot\ln(1/8) = -25.84\cdot\ln(1/8)mV = +53.74\ mV \quad (2)$$

at T=300 K.

Therefore, $\Delta V_{EB}$ has a positive temperature coefficient proportional to absolute temperature. The $V_T$ is called the thermal voltage, K is Boltzmann's constant, T is absolute temperature in degrees Kelvin and Q is the charge of an electron. The P-N junctions have negative temperature coefficients of about 2 mV per degrees K. By balancing these two coefficients at a chosen temperature $T=T_\theta$, a close to 0 temperature coefficient can be obtained at that temperature.

In order for the two currents in FIG. 2 to be equal, the resistor R6 must be greater than the resistor R5. The value $\Delta R$ is defined as the difference R6-R5. The two operating currents are then given by $$I_{Q5,Q6} = \Delta V_{EB}/\Delta R$$

Since $R6=R5+\Delta R$, the output reference voltage will be:

$$V\_REF = V_{EB,Q6} + \Delta V_{EB} + R5 \cdot I_{Q5,Q6}$$

$$V\_REF = V_{EB,Q6} + \Delta V_{EB} + (R5/\Delta R) \cdot \Delta V_{EB} \quad (3)$$

$$V\_REF = V_{EB,Q6} = (1+R5/\Delta R) \cdot \Delta V_{EB}$$

The operating currents and current densities of Q5 and Q6 may be selected to provide a negative temperature coefficient for the $V_{EB}$ determined in equation 3. This can be balanced against the positive temperature term by the resistor ratio $R5/\Delta R$ and also by changing the area ratio between Q5 and Q6. In this particular embodiment this ratio 1:8.

The last part of equation 3 also shows that the last term is independent of any common production tolerance in the absolute value of the resistors. However, the operating current will still vary around the target design value. There will be a logarithmic variation in the first term $V_{EB,Q6}$ over multiple process runs, and hence also in the output voltage. In most cases, this variation is acceptable. There is also an acceptable variation in the negative temperature coefficient of $V_{EB,Q6}$.

According to this finding, the present application uses the double sampling part of the analog signal processing chain of an image sensor to obtain the difference between the voltage V_REF and $V_{EB,Q6}$, in order to output a signal directly proportional to the absolute temperature of the sensor as $$V\_PTAT = (1+R5/\Delta R) \cdot \Delta V_{EB} = (1+R5/\Delta R) \cdot (kT/q) \cdot \ln(A_{Q6}/A_{Q5})$$

Where $A_{Q6}/A_{Q5}$ are respective emitter areas of Q6 and Q5.

This enables temperature measurement to be carried out independently of process variations according to a first order. However, there may be second order variations in the term $\Delta V_{EB}$.

Figure 3:
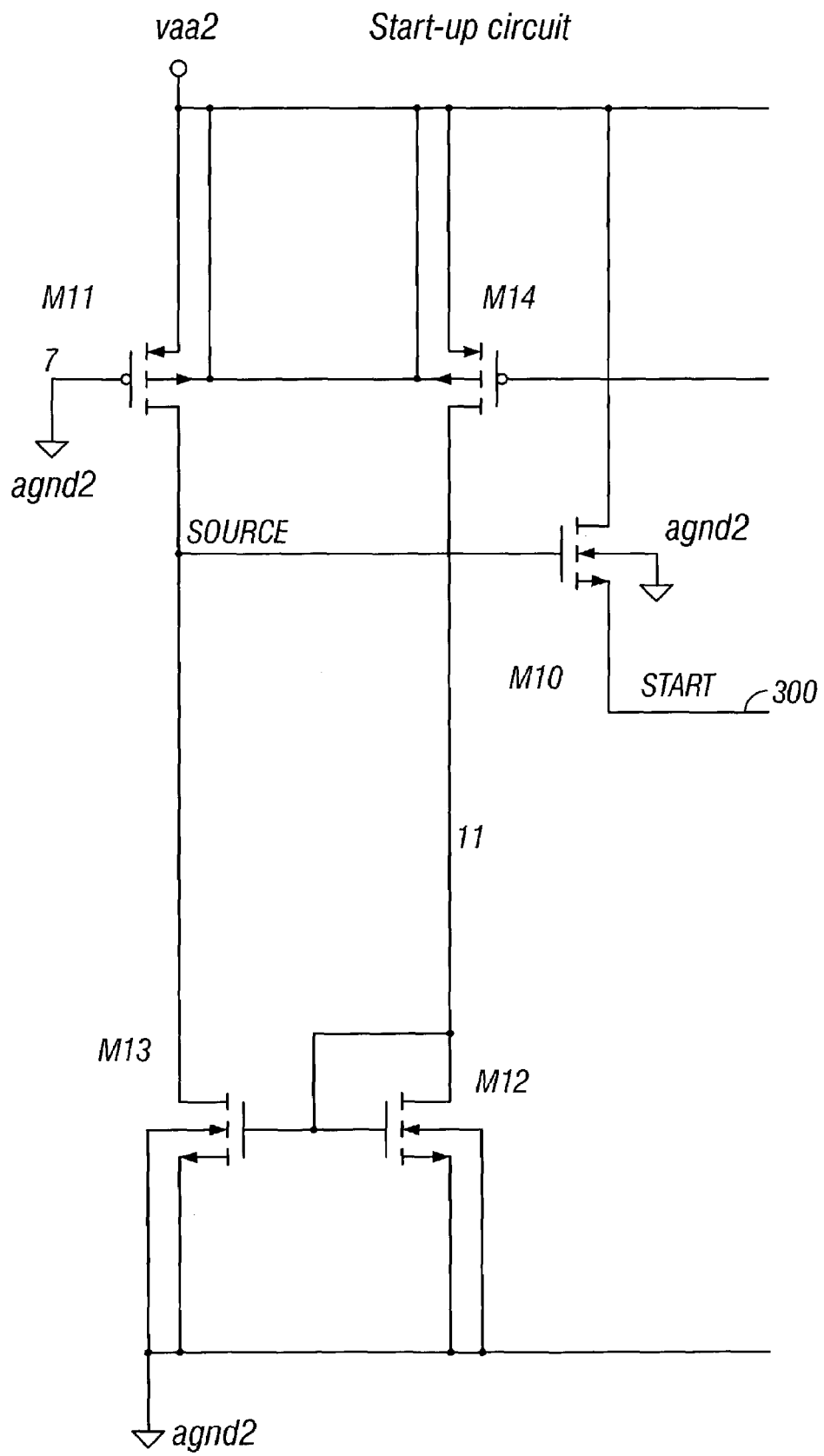
FIG. 3 shows a startup circuit for the bandgap cell.
Figure 4:
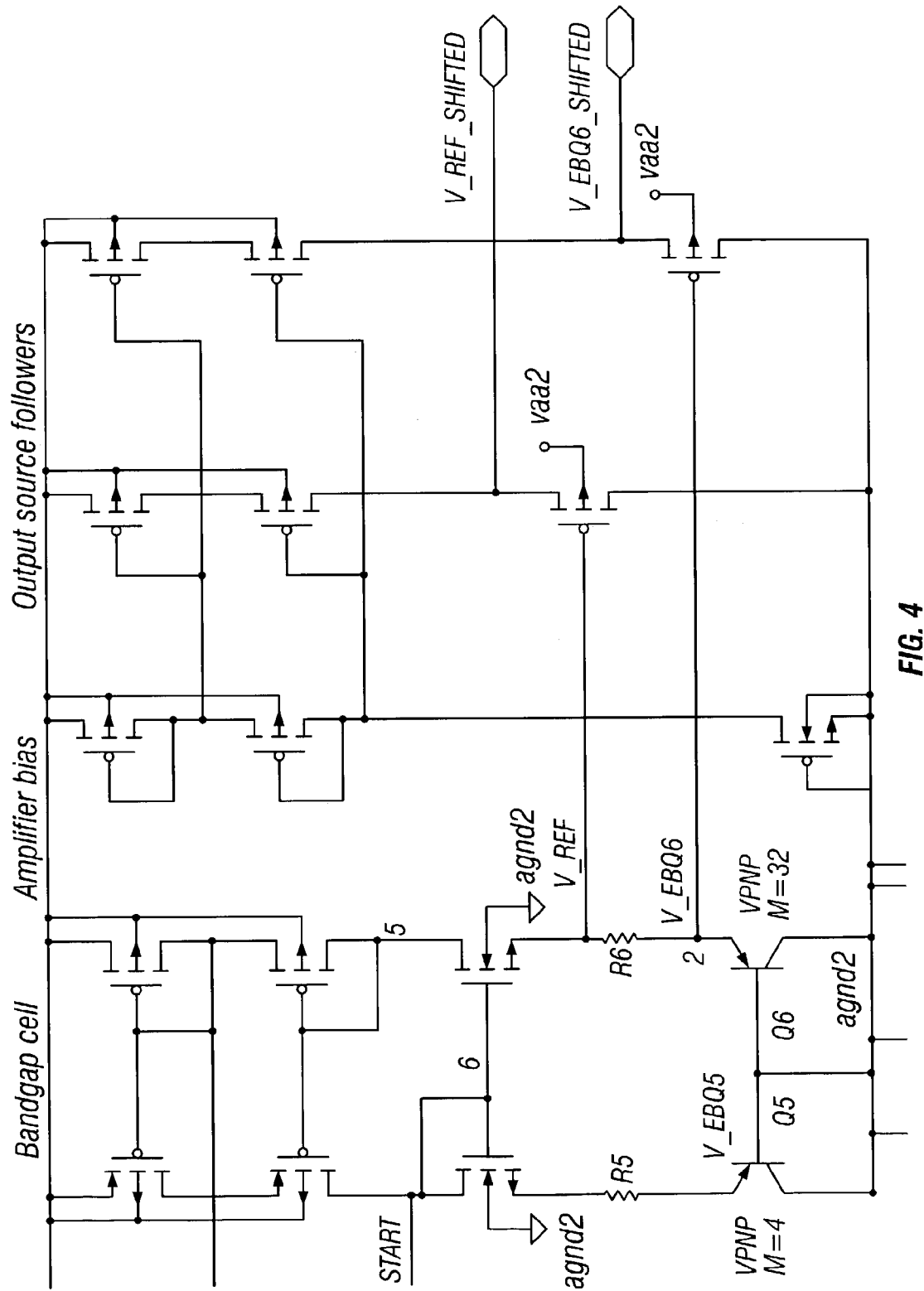
FIG. 4 shows an overall circuit.

FIG. 3 also shows a startup circuit for the bandgap cell shown in FIG. 2. In the FIG. 3 cell, the start node 300 begins with a relatively low potential during startup. Prior to start up, the gate potential of transistor M14 is high so that the transistor does not conduct current. Transistor M11 is a relatively long transistor and can be used as a resistor. M11 will hence always be conducting. This causes the transistor M10 to conduct and provide the start up current. When the FIG. 2 bandgap cell has started, this sets the gate potential of M14 and therefore M14 conducts current. That current is mirrored by the transistors M12, M13 to pull down the source node of M11 so that M10 stops providing its start up current. The circuit also has two buffers and level shifters as shown in FIG. 4. The level shifters bring the two output voltages up to the normal voltage range used for the output of the pixel source followers. These level shifters also lower the output impedance of the bandgap cell. Level shifting needs to be done using carefully matched transistor pairs and matched current sources for the source followers.

Accordingly, the bandgap cell has an inherent start current provided by the start current generating circuit thereby providing a temperature sensed output.

Although only a few embodiments have been disclosed in detail above, other modifications are possible.

What is claimed is:

1. A system, comprising:
   an image processing chain, having first and second parts,
   said second part having a first input adapted for receiving first and second sampled values from an image sensor pixel array, and a second input adapted for receiving another first and second sampled values from a temperature sensor circuit, wherein at least one of a pair of first and second sampled values from said image sensor pixel array and a pair of first and second sampled values from said temperature sensor circuit are output as first and second intermediate values from said second part into said first part; and
   said first part being adapted to automatically subtract said first intermediate value from said second intermediate value to produce an output indicative of a difference between said first sampled value and said second sampled value.

2. A system as in claim 1, further comprising an image sensor pixel array, adapted to produce a plurality of outputs to said first input, and a temperature sensor circuit, adapted to produce outputs to said second input.

3. A system as in claim 2, wherein said temperature circuit includes a start circuit which is operable to initially produce a current to a start node, which reduces once the circuit is operating.

4. A system as in claim 1, wherein said second part is a double sample and hold circuit, which is adapted to receive said first and second sampled values, and to sample and hold said first and second sampled values.

5. A system as in claim 4, wherein said first part is a difference producing circuit, coupled to an output of said double sample and hold circuit, and adapted to produce a difference output indicative of a difference between said first and second sampled values.

6. A system as in claim 4, wherein said double sample and hold circuit is adapted to receive image sensor values from said image sensor indicative of image sensor pixel values prior to image pixel integration and after image pixel integration.

7. A system comprising:
   an image processing chain, having first and second parts,
   said first part being adapted to automatically subtract a first intermediate value from a second intermediate value to produce an output indicative of a difference between a first sampled value and a second sampled value; and
   said second part having a first input adapted for receiving said first and second sampled values from an image sensor pixel array, and a second input adapted for receiving another said first and second sampled values from a temperature sensor circuit, said first and second intermediate values being an output of said second part and an input of said first part,
   wherein said second part is a double sample and hold circuit, which is adapted to receive the first and second sampled values, and to sample and hold said first and second sampled values,
   wherein said double sample and hold circuit is adapted to receive image sensor values at said first input from said image sensor indicative of image sensor pixel values prior to image integration and after image pixel integration, and wherein said double sample and hold circuit is further adapted to receive first and second temperature values at said second input.

8. A system as in claim 7, wherein said system is operable to subtract said first and second temperature values, to provide a temperature signal that is proportional to temperature of the sensor independent of process runs.

9. A system as in claim 8, wherein said first and second temperature values include values which are each dependent on variations in process runs, but whose difference is less dependent on process runs.

10. A system as in claim 9, wherein said first and second temperature values include a value of a voltage stabilized output from a temperature sensitive bandgap cell, and a value related to a temperature coefficient-related value from said bandgap cell.

11. A system comprising:
an image processing chain, having first and second parts,
said first part being adapted to automatically subtract a first intermediate value from a second intermediate value to produce an output indicative of a difference between a first sampled value and a second sampled value;
said second part having a first input adapted for receiving said first and second sampled values from an image sensor pixel array, and a second input adapted for receiving another said first and second sampled values from a temperature sensor circuit, said first and second intermediate values being an output of said second part and an input of said first part; and
an image sensor pixel array, adapted to produce a plurality of outputs to said first input, and a temperature sensor circuit, adapted to produce outputs to said second input,
wherein said second part comprises a double sample and hold circuit within said image processing chain, and wherein said first part is operable to determine a difference between said first and second intermediate values derived from said first and second sampled values from said image sensor pixel array, and is operable to determine a difference between said first and second intermediate values derived from said first and second sampled values from said temperature sensor circuit.

12. A system as in claim 11, wherein said temperature sensing circuit is operable to produce a first output which is temperature related, and a second output which is related to a voltage reference, and said first part is operable to determine a difference between said first and second outputs.

13. A system, comprising:
image sensing elements, including an array of image pixel sensors, producing outputs, including a first output adapted to being produced prior to image pixel integration, and a second output adapted to being produced subsequent to image pixel integration;
a temperature sensing element, located on the same substrate as the image pixel sensing elements, and adapted to produce a first output indicative of a temperature thereof and a second output indicative of a voltage reference; and
a signal processing chain, adapted to produce an output indicative of a difference between the first and second outputs, including a storage circuit connected to receive said first and second outputs of said image sensing elements at a first time and connected to receive said first and second outputs of said temperature sensing elements at a second time.

14. A system as in claim 13, wherein said image sensing element is a CMOS image sensing element.

15. A system as in claim 13, wherein said signal processing chain is on a same substrate as said image sending element and said temperature sensing element.

16. A system as in claim 15, further comprising a control signal generator, also on a same substrate as said image sensing elements, adapted to produce control signals for said image sensor elements, and for said signal processing chain.

17. A system as in claim 13, further comprising an analog to digital converter, adapted to receive an output of said signal processing chain, and adapted to produce a digital signal indicative thereof, which signal represents a digital temperature at one time, and a digital image value at another time.

18. A system as in claim 13, wherein said temperature sensing element is a bandgap cell which adapted to produce a temperature and voltage stabilized reference voltage at one of said outputs, and adapted to produce a temperature signal with a temperature coefficient relative to said voltage reference at another of said outputs.

19. A system as in claim 18, further comprising a start signal producing circuit, which adapted to produce a start voltage for said bandgap cell during initial operation, which start voltage is gradually reduced in absolute value after said initial operation.

20. A system as in claim 18, wherein said signal processing chain is a double sampling and hold circuit that is adapted to receive image sensor pixels at said first time, and is adapted to receive said reference voltage and temperature signal at said second time.

21. A method, comprising:
using a correlated double sampling circuit to produce an output indicative of an output of an image sensor; and
using the same correlated double sampling circuit to produce a temperature output of a temperature sensor.

22. A method as in claim 21, wherein said output of said temperature sensor is an output which is compensated for process variations amongst different circuits.

23. A method as in claim 22, wherein said output of said image sensor is an output which is a difference between voltage prior to image pixel integration and voltage subsequent to image pixel integration.

24. A method as in claim 21, wherein said output of said correlated double sampling circuit and said output of said temperature sensor are in analog form.

25. A method as in claim 24, further comprising converting said output signals to a digital form.

26. A method as in claim 21, further comprising producing said temperature outputs at specified intervals between image sensor outputs.

27. A method as in claim 26, wherein a new said temperature outputs are produced for each frame.

28. A method as in claim 26, wherein a new said temperature outputs are produced for each specified amount of image sensor outputs.

29. A method as in claim 21, further comprising producing a start signal for said temperature sensor which is initially conducting and subsequently less conducting, as the temperature sensor begins to operate.

30. A method, comprising:
producing image signal outputs indicative of image pixels;
producing temperature outputs indicative of a temperature of a system that is producing said image pixels, and
receiving by a sampling circuit values from said image pixels and values of said temperature of said system,
wherein said producing image signal outputs and said producing temperature outputs comprises using a same difference circuit coupled to said sampling circuit to produce both said image signal outputs and said temperature outputs.

31. A method as in claim 30, wherein said difference circuit receives a first voltage output that is indicative of a temperature, and receives a second voltage output that is indicative of a voltage reference related signal, but where said first and second outputs are both dependent on a same process variation in the circuit, and said difference circuit operates to subtract one of said outputs from said other of said outputs.

* * * * *

UNITED STATES PATENT AND TRADEMARK OFFICE
CERTIFICATE OF CORRECTION

| | | |
|---|---|---|
| PATENT NO. | : 7,280,139 B2 | Page 1 of 1 |
| APPLICATION NO. | : 10/202623 | |
| DATED | : October 9, 2007 | |
| INVENTOR(S) | : Pahr et al. | |

It is certified that error appears in the above-identified patent and that said Letters Patent is hereby corrected as shown below:

In column 6, line 8, in Claim 15, delete "sending" and insert -- sensing --, therefor.

In column 6, line 12, in Claim 16, delete "elements" and insert -- element --, therefor.

In column 6, line 13, in Claim 16, delete "elements" and insert -- element --, therefor.

Signed and Sealed this

Twenty-fifth Day of December, 2007

JON W. DUDAS
*Director of the United States Patent and Trademark Office*